US010706256B2

(12) United States Patent
He et al.

(10) Patent No.: US 10,706,256 B2
(45) Date of Patent: Jul. 7, 2020

(54) DISPLAY MODULE AND ELECTRONIC DEVICE

(71) Applicant: SHANGHAI TIANMA MICRO-ELECTRONICS CO., LTD., Shanghai (CN)

(72) Inventors: Yongxin He, Shanghai (CN); Yuan Ding, Shanghai (CN); Yang Zeng, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 370 days.

(21) Appl. No.: 15/865,207

(22) Filed: Jan. 8, 2018

(65) Prior Publication Data

US 2018/0129850 A1    May 10, 2018

(30) Foreign Application Priority Data

Jul. 26, 2017    (CN) .......................... 2017 1 0620772

(51) Int. Cl.

| G06F 1/16 | (2006.01) |
|---|---|
| H04M 1/02 | (2006.01) |
| G06K 9/00 | (2006.01) |
| G09G 3/20 | (2006.01) |

(52) U.S. Cl.
CPC ......... *G06K 9/0012* (2013.01); *G06F 1/1637* (2013.01); *G06F 1/1684* (2013.01); *G06F 1/1692* (2013.01); *G06K 9/0004* (2013.01); *G06K 9/00033* (2013.01); *H04M 1/026* (2013.01); *G09G 3/20* (2013.01); *G09G 2354/00* (2013.01); *G09G 2358/00* (2013.01); *H04M 1/0266* (2013.01)

(58) Field of Classification Search
CPC ........................... G06F 1/1684; H04M 1/0266
See application file for complete search history.

(56) References Cited

U.S. PATENT DOCUMENTS

| 10,366,272 B2 * | 7/2019 | Song .................. G06K 9/00033 |
|---|---|---|
| 10,452,937 B2 * | 10/2019 | Jin ............................ G09G 5/10 |
| 2019/0012555 A1 * | 1/2019 | Bae ...................... G06K 9/0004 |
| 2019/0073505 A1 * | 3/2019 | Kwon .................... G01B 11/24 |

(Continued)

*Primary Examiner* — Robert J Hoffberg
(74) *Attorney, Agent, or Firm* — Kilpatrick Townsend & Stockton, LLP

(57) ABSTRACT

Provided are a display module and an electronic device. The display module includes a display screen, the display screen comprising a display surface and a non-display surface opposite to the display surface; a first heat conduction member, the first heat conduction member laminated on the non-display surface, a first through hole defined in the first heat conduction member, the non-display surface comprising an exposed portion exposed in the first through hole; a photosensitive module, the photosensitive module laminated on the exposed portion; and a second heat conduction member contacting each of the photosensitive module and the first heat conduction member; the first heat conduction member comprising a first inner sidewall formed due to formation of the first through hole, and a contact area between the second heat conduction member and the photosensitive module is larger than an area of the photosensitive module directly facing the first inner sidewall.

20 Claims, 7 Drawing Sheets

(56) References Cited

U.S. PATENT DOCUMENTS

| | | | |
|---|---|---|---|
| 2019/0087630 A1* | 3/2019 | Seo | G06K 9/0012 |
| 2019/0205600 A1* | 7/2019 | Kim | G06F 1/1643 |
| 2019/0244002 A1* | 8/2019 | Ye | G06K 9/00013 |
| 2019/0303640 A1* | 10/2019 | Song | G06K 9/0004 |

* cited by examiner

DISPLAY MODULE AND ELECTRONIC DEVICE

CROSS-REFERENCE TO RELATED APPLICATIONS

The present application claims priority to Chinese Patent Application No. 201710620772.9, filed on Jul. 26, 2017, the content of which is incorporated herein by reference in its entirety.

TECHNICAL FIELD

The present invention relates to the field of display techniques and, particularly, relates to a display module and an electronic device.

BACKGROUND

At present, demands on performance of the display screen have become higher and higher. Take the display screen of an active matrix organic light emitting diode (AMOLED) for example, in order to add a fingerprint unlocking function to the display screen, a photosensitive module is generally used, and the photosensitive module is adhered on a back surface of the display screen by an optically clear adhesive (OCA) layer.

The photosensitive module generally includes a sensing layer and a collimating optical fiber layer on a glass or a thin-film layer, and the sensing layer, the collimating optical fiber layer and the OCA layer are sequentially stacked. Since the glass plate in the photosensitive module has good heat conduction, heat distribution in an area with the photosensitive module and other area of the display screen is non-uniform, and thus the display screen may display obviously non-uniform brightness when the display is lightened.

SUMMARY

The present invention provides a display module and an electronic device, which can improve the non-uniform brightness phenomenon of the display screen.

Embodiments of the present invention provide a display module, including: a display screen, a first heat conduction member, a photosensitive module, and a second heat conduction member. The display screen comprises a display surface and a non-display surface opposite to the display surface. The first heat conduction member is laminated on the non-display surface. A first through hole is defined in the first heat conduction member. The non-display surface comprises an exposed portion exposed from the first through hole. The photosensitive module is laminated on the exposed portion. The second heat conduction member contacts each of the photosensitive module and the first heat conduction member. The first heat conduction member comprises a first inner sidewall formed by defining the first through hole, and a contact area between the second heat conduction member and the photosensitive module is larger than an area of the photosensitive module directly facing the first inner sidewall.

Embodiments of the present invention further provide an electronic device including the display module as described above.

The solutions provided by the present invention can have at least the following beneficial effects:

In order to realize uniform heat distribution of a display screen, embodiments of the present invention provide a display module, including a second heat conduction member contacting both the first heat conduction member and the photosensitive module, the setting of the second heat conduction member speeds up heat exchange between the area with the photosensitive module and other area of the display screen, thereby making temperature of all the areas of the display screen tend to be identical, and improving non-uniform brightness phenomenon when the display module displays.

It should be interpreted that the general description above and the detailed description below are merely exemplary and cannot limit the present application.

REFERENCE SIGNS

1—display screen;
11—non-display surface;
11a—exposed portion;
2—first heat conduction member;
21—first through hole;
21a—first inner sidewall;
22—slit;

3—photosensitive module;
4—second heat conduction member;
41—second through hole;
41a—second inner sidewall;
42—first portion;
43—second portion;
43a—tapered surface;
5—third heat conduction member;
51—straight-line-shaped slit;
52—covering portion;
100—electronic device.

The drawings here are incorporated in the specification and form one section of the specification, which have shown embodiments of the present invention and are used together with the specification to explain the principle of the present invention.

DESCRIPTION OF EMBODIMENTS

The following is further detailed description of the present invention through specific embodiments with the drawings incorporated.

It should be noted that, the words "top", "bottom", "left", and "right" mentioned in the invention are all described in an angle shown in the corresponding drawings, which are not intended to limit embodiments of the present invention. Besides, it should be understood that, in the context, when it is mentioned that an element is formed "on" or "below" another element, the element can be directly or indirectly formed "on" or "below" the another element.

Figure 1:
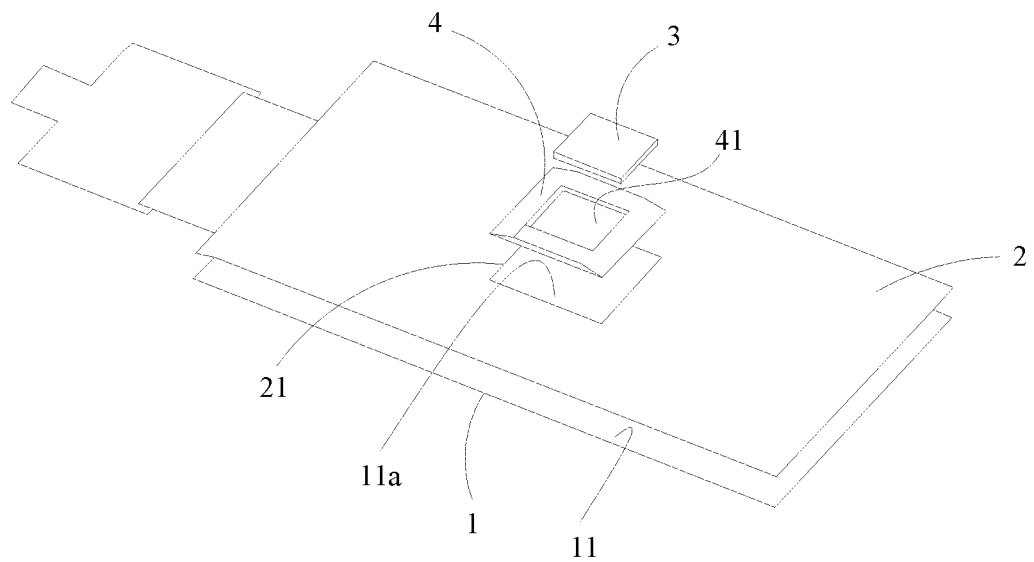
FIG. 1 illustrates a partial exploded structural view of a display module according to an embodiment of the present invention.

FIG. 1 illustrates a partial exploded structural view of a display module according to an embodiment of the present invention. As shown in FIG. 1, the display module includes a display screen 1, a first heat conduction member 2, and a photosensitive module 3.

The display screen 1 includes a display surface and a non-display surface 11 on a back of the display surface. The first heat conduction member 2 is laminated on the non-display surface 11. In some embodiments, the first heat conduction member 2 may be made of a composite material of foam, graphite sheet and copper foil, and is fixed on the non-display surface 11 by adhering.

On one hand, the first heat conduction member 2 realizes the heat conduction of the display screen 1, and on the other hand, when the display screen 1 is a flexible screen, the first heat conduction member 2 can also play a role of improving strength of the flexible screen.

The photosensitive module 3 is an element for sensing and recognizing light, and the fingerprint unlock function and the like can be realized by placing the photosensitive module 3 at a certain position of the display screen 1. Generally, the photosensitive module 3 includes, on a glass or film layer, at least one sensing layer, a collimating optical fiber layer and an optically clear adhesive layer. The photosensitive module 3 is fixed on the non-display surface 11 of the display screen 1 by the optically clear adhesive layer.

In one embodiment, a first through hole 21 is defined in the first heat conduction member 2, the non-display surface 11 includes an exposed portion 11a exposed from the first through hole 21, and the photosensitive module 3 is laminated on the exposed portion 11a, so as to realize contact between the photosensitive module 3 and the non-display surface 11. The first heat conduction member 2 includes a first inner sidewall 21a by defining the first through hole 21.

The contact between the photosensitive module 3 and the non-display surface 11 can realize communication therebetween. When a user touches the photosensitive module 3, the photosensitive module 3 sends out an electrical signal, and an integrated circuit set in the display screen 1 receives and processes the electrical signal.

It can be easily understood that, after the photosensitive module 3 is provided, a heat distribution in the area of the display screen 1 provided with the photosensitive module 3 may be different from a heat distribution in other area of the display screen 1. When the display screen 1 is lightened, obviously non-uniform brightness phenomenon can be seen on the display surface due to non-uniformity of the heat distribution.

In view of this, in an embodiment of the present invention, the display module further includes a second heat conduction member 4. The second heat conduction member 4 contacts both the photosensitive module 3 and the first heat conduction member 2, and a contact area between the second heat conduction member 4 and the photosensitive module 3 is larger than an area of the photosensitive module 3 directly facing the first inner sidewall 21a. By adding the second heat conduction member 4, an heat conduction area between the second heat conduction member 4 and the photosensitive module 3 is increased, and thus heat exchange between the area with the photosensitive module 3 and other area can be speeded up, thereby making temperature of all the areas of the display screen 1 tend to be identical, and improving non-uniform brightness phenomenon when the display module displays.

Figure 1A:
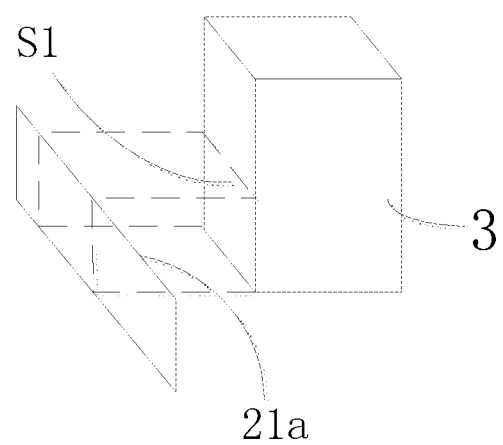
FIG. 1a illustrates a schematic diagram I of an area of the photosensitive module directly facing an first inner sidewall in a display module according to an embodiment of the present invention.
Figure 1B:
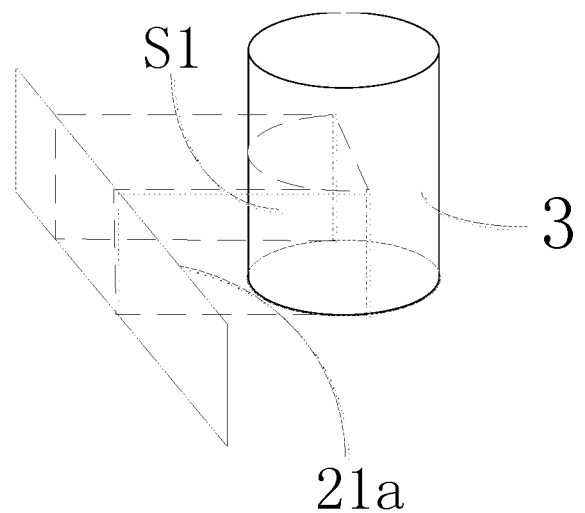
FIG. 1b illustrates a schematic diagram II of an area of the photosensitive module directly facing an first inner sidewall in a display module according to an embodiment of the present invention.

Herein "area of the photosensitive module 3 directly facing the first inner sidewall 21a" is illustrated as follows. As shown in FIG. 1a, both the first through hole 21 and the photosensitive module 3 are rectangular structures. For example, when seen from one side thereof, the area of the photosensitive module 3 directly facing the first inner sidewall 21a is the area of portion S1 shown in FIG. 1a. However, as shown in FIG. 1b, the first through hole 21 is rectangular, the photosensitive module 3 is a cylinder; for example, still seen from one side thereof, the area of the photosensitive module 3 directly facing the first inner sidewall 21a is the area of portion S1 shown in FIG. 1b.

As illustrated above, the first through hole 21 is used to realize contact between the photosensitive module 3 and the non-display surface 11, thereby realizing electrical signal transmission between the photosensitive module 3 and the integrated circuit. Moreover, the first through hole 21 can further realize contact between the second heat conduction member 4 and each of the photosensitive module 3 and the display screen 1, so as to realize fast heat exchange. In view of the above, based on the original first through hole 21, it can be further arranged that a size of the first through hole 21 is appropriately increased, and the second heat conduction member 4 is placed inside the first through hole 21, such that contact between the second heat conduction member 4 and the display screen 1 is realized.

Further in an embodiment of the present invention, a second through hole 41 is defined in the second heat conduction member 4, and the photosensitive module 3 is placed inside the second through hole, so as to realize contact between the photosensitive module 3 and the non-display surface 11.

The above solution not only realizes the contact between the photosensitive module 3 and the non-display surface 11, but also realizes the contact between the second heat conduction member 4 and the display screen 1, such that heat conduction rate of the second heat conduction member 4 is increased, and thermal uniformity of the area with the photosensitive module 3 and other area of the display screen 1 is significantly improved.

Figure 2:
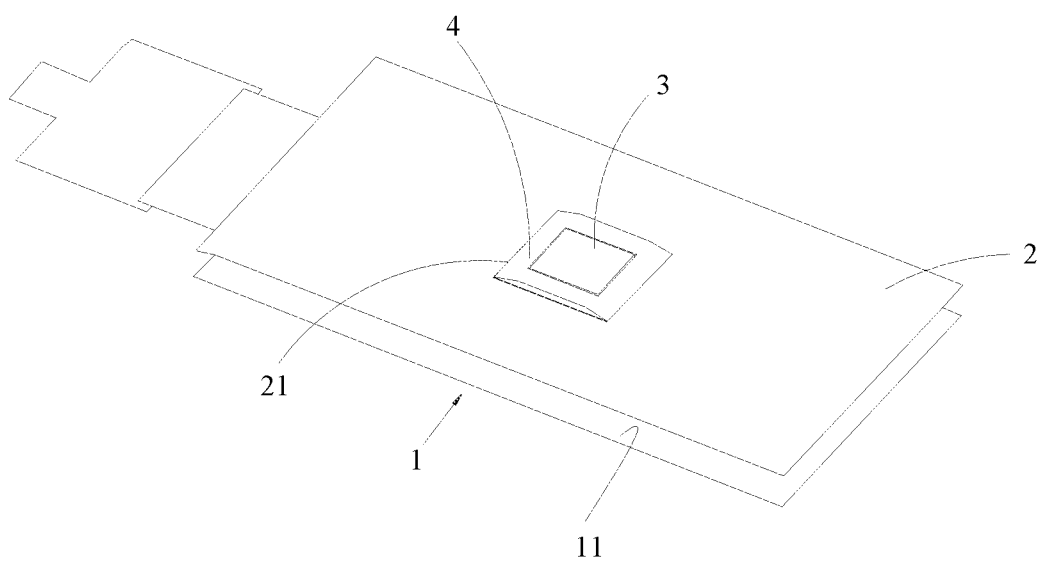
FIG. 2 illustrates a partial assembly diagram of a display module according to an embodiment of the present invention.

Please refer to FIG. 2, which illustrates a partial assembly diagram of a display module according to an embodiment of the present invention.

Figure 3:
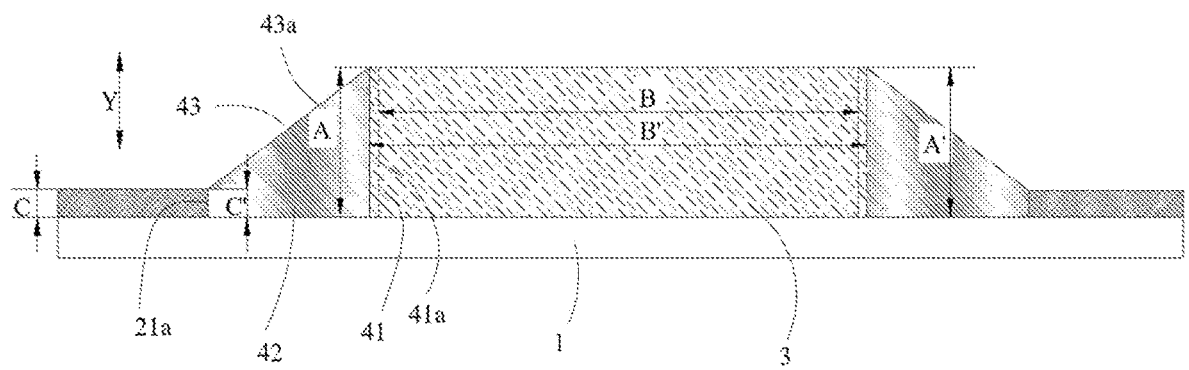
FIG. 3 illustrates a partial sectional view of a display module according to an embodiment of the present invention.

Please refer to FIG. 3, which illustrates a partial sectional view of a display module according to an embodiment of the present invention. In order to simplify the connection structure of the photosensitive module 3 and the second heat conduction member 4, in the second through hole 41, the photosensitive module 3 is tightly connected with the second heat conduction member 4 in an interference fit manner, that is, size B' of the photosensitive module 3 is larger than size B of the second through hole 41, so that, when assembling, a tight fit between the photosensitive module 3 and the second through hole 41 can be realized by directly pressing the photosensitive module 3 into the second through hole 41, so as to simplify the assembling process of the display module.

Figure 3A:
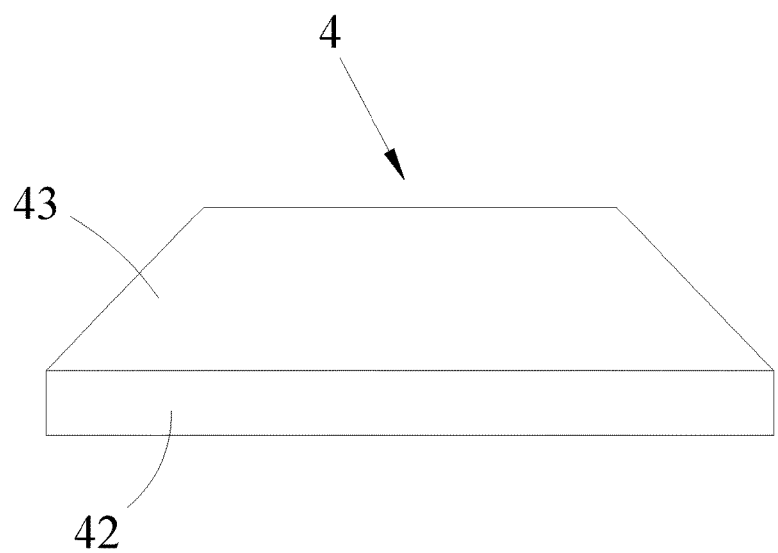
FIG. 3a illustrates a front view of a second heat conduction member in a display module according to an embodiment of the present invention.

In an embodiment shown in FIG. 3a, the second heat conduction member 4 includes a first portion 42 and a second portion 43 connected with the first portion 42, the first portion 42 and the second portion 43 are arranged in a direction perpendicular to the display screen 1, and the second portion 43 is placed above the first portion 42. In one embodiment, the first portion 42 is a cylinder, and the cylinder contacts the exposed portion 11a, so as to realize contact between the second heat conduction member 4 and the display screen 1, and meantime the second through hole 41 extends through the first portion 42 and the second portion 43 along an axial direction of the cylinder.

The first inner sidewall 21a contacts the cylinder, height C' of the cylinder in a direction perpendicular to the display screen 1 (direction Y shown in FIG. 3) is identical to height C of the first inner sidewall 21a in the same direction, such that in the direction Y, a larger contact area is formed between the cylinder and the first inner sidewall 21a, realizing good heat conduction between the cylinder and the first inner sidewall 21a; in addition, the identical height of the cylinder and the first inner sidewall 21a in the direction Y facilitates to reduce the probability of occurrence of undesirable phenomenon, such as bubbles.

The second heat conduction member 4 includes a second inner sidewall 41a formed by defining the second through hole 41. The second inner sidewall 41a contacts the photosensitive module 3, height A' of the photosensitive module 3 in the direction perpendicular to the display screen 1 (direction Y) is identical to height A of the second inner sidewall 41a in the same direction. Similarly, a larger contact area between the photosensitive module 3 and the second inner sidewall 41a in the direction Y can be realized, thereby realizing good heat conduction between the two, improving the non-uniform heat distribution phenomenon of the display screen 1.

Figure 4:
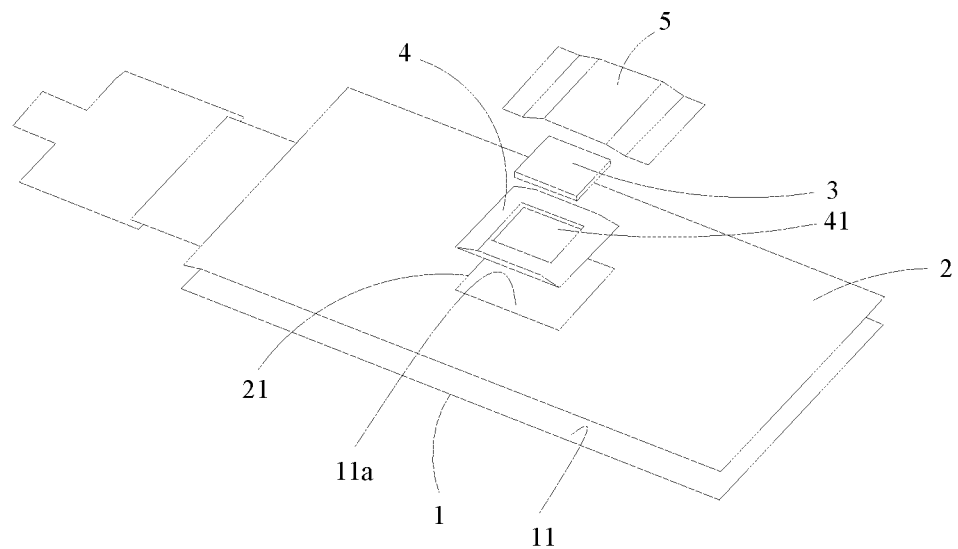
FIG. 4 illustrates an exploded diagram of a display module provided with a third heat conduction member according to an embodiment of the present invention.

Further, as shown in FIG. 4, the display module of the present application further includes a third heat conduction member 5, the third heat conduction member 5 is laminated on both the photosensitive module 3 and the first heat conduction member 2, and the third heat conduction member 5 is laminated on a side of the photosensitive module 3 away from the non-display surface 11.

The arrangement of third heat conduction member 5 increases a heat conduction route between the area with the photosensitive module 3 and other area in of display screen 1, such that heat conduction of the display screen 1 is not limited to be from the second heat conduction member 4 to the first heat conduction member 2, thereby increasing thermal conductivity of the display screen 1, effectively improving the non-uniform brightness phenomenon of the display screen 1.

Figure 5:
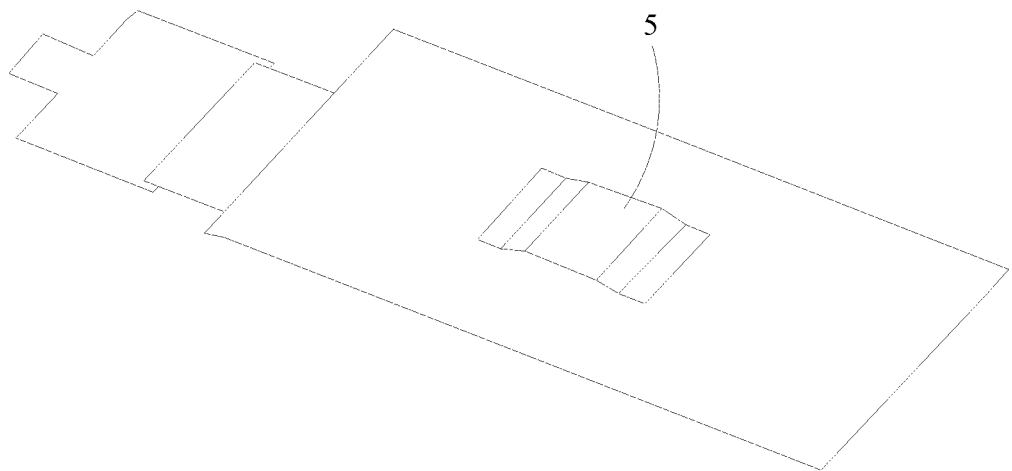
FIG. 5 illustrates an assembly diagram of a display module with a third heat conduction member according to an embodiment of the present invention.

Please refer to FIG. 5, which illustrates an assembly diagram of a display module with a third heat conduction member according to an embodiment of the present invention.

According to an embodiment, it can be arranged that the third heat conduction member 5 contacts the first heat conduction member 2, but does not contact the second heat conduction member 4. For example, the third heat conduction member 5 is set as a heat conductor made of a metal material, and is formed by mold pressing so as to maintain a fixed shape, such that a gap can be maintained between the third heat conduction member 5 and the second heat conduction member 4.

In one embodiment, it can also be arranged that the third heat conduction member 5 contacts the second heat conduction member 4, that is, heat is conducted from a heat conduction route sequentially from the third heat conduction member 5, to the second heat conduction member 4, then to the first heat conduction member 2. It can be understood upon analysis that, at this time, there are two heat conduction routes, one goes from the third heat conduction member 5 directly to the first heat conduction member 2, and the other one goes from the third heat conduction member 5, to the second heat conduction member 4, then to the first heat conduction member 2.

Please further refer to FIG. 3a. In one embodiment, the second portion 43 is a tapered body, a large end of the tapered body is connected with the first portion 42, and the third heat conduction member 5 extends from the photosensitive module 3 along a tapered surface 43a of the tapered body to the first heat conduction member 2. Thus, it can be known that, transition of the tapered surface 43a can reduce bending angle of the third heat conduction member 5 when extending from the photosensitive module 3 to the second heat conduction member 4, which reduces the risk of occurrence of wrinkles of the third heat conduction member 5, and imparts good lamination between the third heat conduction member 5 and the second heat conduction member 4, thereby increasing contact area between the two, good for heat conduction therebetween.

According to an embodiment of the present invention, a slope of the tapered surface 43a can be in a range of 30°~80°. It should be noted, in some other embodiments, the slope of the tapered surface 43a can be other values, depending on actual situations.

Figure 6:
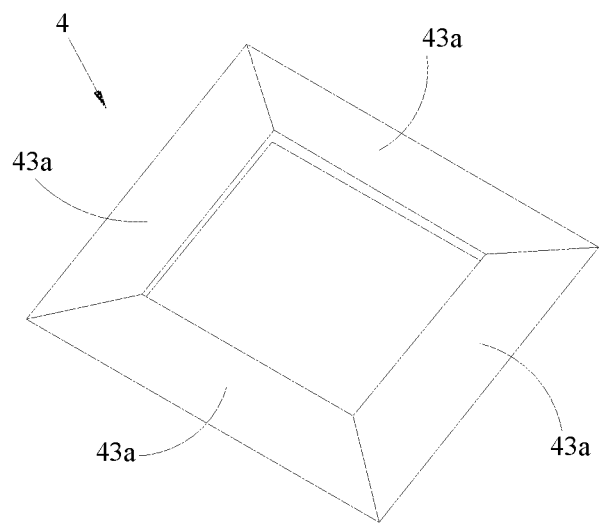
FIG. 6 illustrates a perspective view of a second heat conduction member in a display module according to an embodiment of the present invention.

Please refer to FIG. 6, which illustrates a perspective view of a second heat conduction member in a display module according to an embodiment of the present invention. The second portion 43 can further include a plurality of tapered surfaces 43a, the plurality of tapered surfaces 43a are inclined in a same slope, and are connected end-to-end. That is, the third heat conduction member 5 can extend from the photosensitive module 3 along different tapered surfaces 43a to the first heat conduction member 2, so that the arrangement of the position of the third heat conduction member 5 can be more flexible.

The first portion 42 and the second portion 43 can be separately formed, that is, the first portion 42 and the second portion 43 are independently manufactured, and then are connected by adhering or locking; or, the first portion 42 and the second portion 43 can be integrally formed by using a mold.

Figure 7:
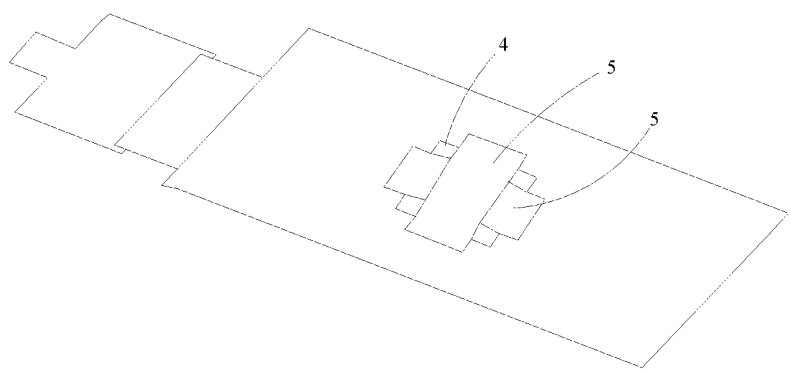
FIG. 7 illustrates a schematic diagram showing a third heat conduction member laminated on a photosensitive module in a display module according to an embodiment of the present invention.

Please refer to FIG. 7, which illustrates a schematic diagram showing a third heat conduction member laminated on a photosensitive module in a display module according to an embodiment of the present invention.

In order to further increase the heat conduction route and heat conduction rate, the display screen can include two third heat conduction members 5, and both of the two third heat conduction members 5 are strip-like structures, and are intersected with each other in a cross and laminated on the photosensitive module 3. The cross helps to avoid concentration of heat distribution, and improve deficiency of heat exchange under a single heat conduction route. It should be noted that, the third heat conduction member 5 itself can be a cross-shaped structure, that is, the cross is not limited to be formed by intersection of two third heat conduction members 5.

It should be noted that, the configuration of the second portion 43 and the number of the third heat conduction member 5 are not limited to the solution as shown in FIG. 5. For example, in some embodiments, the second portion 43 can be arranged to be a triangular pyramid, a pentagonal pyramid, a hexagonal pyramid or a cone, and the number of the third heat conduction member 5 can be three or more.

When the number of the third heat conduction member 5 is more than one, at least two of the third heat conduction members 5 are intersected with one another with a certain angle therebetween and are laminated on the photosensitive module 3, so that the third heat conduction member 5 can contact the first heat conduction member 2 through different heat conduction routes, thereby speeding up heat conduction.

Figure 8:
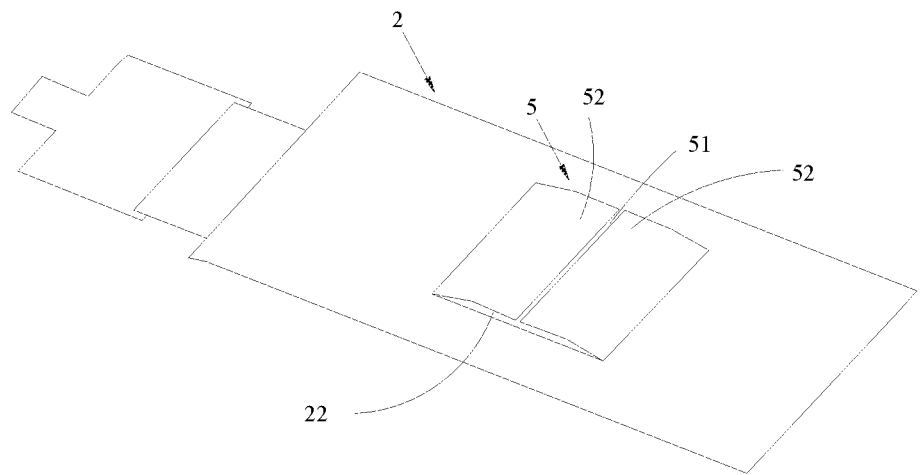
FIG. 8 illustrates a schematic diagram of a display module in which a first heat conduction member and a third heat conduction member are integrally formed according to an embodiment of the present invention.

Please refer to FIG. 8, which illustrates a schematic diagram of a display module in which a first heat conduction member and a third heat conduction member are integrally formed according to an embodiment of the present invention. As shown in FIG. 8, the third heat conduction member 5 and the first heat conduction member 2 are formed on a same heat conduction base material, which can save material, reduce manufacturing cost, and simplify manufacturing process of the display module.

In one embodiment, the third heat conduction member 5 is placed on a middle area of the first heat conduction member 2, two parallel slits 22 are defined in the first heat conduction member 2, and a straight-line-styled slit 51 is defined in the third heat conduction member 5. The slits 22 and the straight-line-styled slit 51 cooperatively form an opening in the heat conduction base material, and the photosensitive module 3 and the second heat conduction member 4 can contact the non-display surface 11 via this opening.

The third heat conduction member 5 includes a covering portion 52. The covering portion 52 covers the photosensitive module 3, and the straight-line-styled slit 51 is defined in the covering portion 52, so that the third heat conduction member 5 is divided into two sections by the straight-line-styled slit 51, and two covering portions 52 are formed accordingly.

Figure 9:
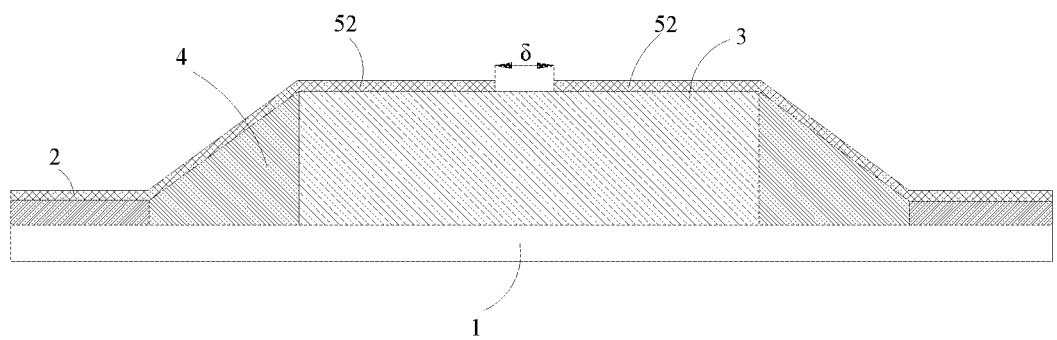
FIG. 9 illustrates a partial sectional view of the structure showing in FIG. 8.

Please refer to FIG. 9, which illustrates a partial sectional view shows that the photosensitive module 3 and the second heat conduction member 4 are laminated on the non-display surface 11 via the opening, the two sections of the covering portion 52 cover the photosensitive module 3. By the photosensitive module 3 and the second heat conduction member 4, a gap δ is formed between the two sections of the covering portion 52.

In one embodiment, the forming manner of the opening is not limited to a manner using the slits 22 and the straight-line-styled slit 51. The opening can be formed in some other alternative manners. For example, in some other embodiments, the opening can be formed by a T-shaped slit and C-shaped slit. Moreover, the number of the covering portion 52 is not limited to two, for example, one, or more than 2.

In one embodiment of the present invention, each of the first heat conduction member 2, the second heat conduction member 4 and the third heat conduction member 5 is a sheet-like structure, and made of a heat conduction material, for example, metal, graphite, etc. Heat conduction coefficients of the heat conduction members can be selected according to actual situation, which is not limited in the present invention.

In addition, it should be noted that, the second heat conduction member 4 is not limited to the above materials, and in some other embodiments, the second heat conduction member 4 can also be set to be a heat conduction gel layer (a gel layer that can conduct heat) which is used to contact the first heat conduction member 2 and the photosensitive module 3, respectively.

The heat conduction gel layer can surround the photosensitive module 3 along a contour line of the first through hole 21, so as to realize thermal interaction between the photosensitive module 3 and the first heat conduction member 2, thereby realizing uniform heat distribution of the display screen.

Based on the display module, an embodiment of the present invention further provides an electronic device 100, including the display module according to any embodiment above.

Figure 10:
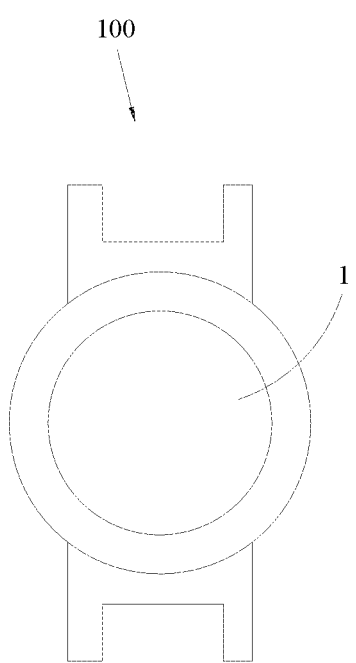
FIG. 10 illustrates a schematic diagram of an electronic diagram according to an embodiment of the present invention.

Please refer to FIG. 10, which illustrates a schematic diagram of an electronic diagram according to an embodiment of the present invention.

The above are merely embodiments of the present invention, which are not used to limit the present invention, and for those skilled in the art, the present invention can have a variety of modifications and changes. Whatever in the principles of the present invention, including any modification, equivalent substitution, improvement, etc., shall fall into the protection scope of the present invention.

What is claimed is:

1. A display module, comprising:
   a display screen, the display screen comprising a display surface and a non-display surface opposite to the display surface;
   a first heat conduction member, the first heat conduction member being laminated on the non-display surface, a first through hole being defined in the first heat conduction member, the non-display surface comprising an exposed portion exposed from the first through hole;
   a photosensitive module, the photosensitive module being laminated on the exposed portion; and
   a second heat conduction member, the second heat conduction member contacting each of the photosensitive module and the first heat conduction member;
   wherein the first heat conduction member comprising a first inner sidewall formed by defining the first through hole, and a contact area between the second heat conduction member and the photosensitive module is larger than an area of the photosensitive module directly facing the first inner sidewall.

2. The display module according to claim 1, wherein the second heat conduction member is placed in the first through hole, a second through hole is defined in the second heat conduction member, and the photosensitive module is placed in the second through hole.

3. The display module according to claim 2, wherein in the second through hole, the photosensitive module and the second heat conduction member are in an interference fit.

4. The display module according to claim 2, wherein the second heat conduction member comprises a first portion and a second portion connected with the first portion, the first portion and the second portion are arranged in a direction perpendicular to the display surface, the first portion is a cylinder laminated on the exposed portion, and the second through hole extends through the first portion and the second portion along an axial direction of the cylinder;
the first inner sidewall contacts the cylinder; and
a height of the cylinder in the direction perpendicular to the display surface is identical to a height of the first inner sidewall in the direction perpendicular to the display surface.

5. The display module according to claim 2, wherein the second heat conduction member comprises a second inner sidewall formed by defining the second through hole, the second inner sidewall contacts the photosensitive module,
a height of the photosensitive module in a direction perpendicular to the display surface is identical to a height of the second inner sidewall in the direction perpendicular to the display surface.

6. The display module according to claim 1, further comprising a third heat conduction member laminated on both the photosensitive module and the first heat conduction member,
wherein the third heat conduction member is laminated on a side of the photosensitive module away from the non-display surface.

7. The display module according to claim 6, wherein the third heat conduction member further contacts the second heat conduction member.

8. The display module according to claim 7, wherein the second heat conduction member comprises a first portion and a second portion connected with the first portion, and the first portion and the second portion are arranged in a direction perpendicular to the display surface, the first portion is laminated on the exposed portion;
the second portion is a tapered body comprising at least one tapered surface, a large end of the tapered body is connected with the first portion, and the third heat conduction member extends from the photosensitive module along the at least one tapered surface of the tapered body to the first heat conduction member.

9. The display module according to claim 8, wherein a slope of each of the at least one tapered surface is in a range of 30°~80°.

10. The display module according to claim 8, wherein the at least one tapered surface comprises a plurality of tapered surfaces and each of the plurality of tapered surfaces is inclined in a same slope, and is connected with one another end-to-end.

11. The display module according to claim 8, wherein the first portion and the second portion are integrally formed.

12. The display module according to claim 6, wherein the third heat conduction member and the first heat conduction member are together formed as an integral structure.

13. The display module according to claim 12, wherein a slit is defined in the third heat conduction member, the third heat conduction member comprises a covering portion covering the photosensitive module, and the slit is defined in the covering portion.

14. The display module according to claim 13, wherein a number of the covering portion is at least two, and the at least two covering portions are spaced and formed by the slit.

15. The display module according to claim 13, wherein the slit is a straight-line-styled slit, and the third heat conduction member is divided into two sections by the straight-line-styled slit.

16. The display module according to claim 6, wherein a number of the third heat conduction member is more than one, each of the third heat conduction members is a strip-like structure, and at least two of the third heat conduction members intersect with one another with a certain angle therebetween and are laminated on the photosensitive module, the certain angle being not zero.

17. The display module according to claim 16, wherein the number of the third heat conduction members is two, and the two third heat conduction members are intersected with one another in a cross and are laminated on the photosensitive module.

18. The display module according to claim 1, wherein the second heat conduction member is a heat conduction gel layer.

19. The display module according to claim 18, wherein the heat conduction gel layer surrounds the photosensitive module along a contour line of the first through hole.

20. An electronic device, comprising a display module, wherein the display module comprises:
a display screen, the display screen comprising a display surface and a non-display surface opposite to the display surface;
a first heat conduction member, the first heat conduction member being laminated on the non-display surface, a first through hole being defined in the first heat conduction member, the non-display surface comprising an exposed portion exposed from the first through hole;
a photosensitive module, the photosensitive module being laminated on the exposed portion; and
a second heat conduction member, the second heat conduction member contacting each of the photosensitive module and the first heat conduction member;
wherein the first heat conduction member comprises a first inner sidewall formed by defining the first through hole, and a contact area between the second heat conduction member and the photosensitive module is larger than an area of the photosensitive module directly facing the first inner sidewall.

* * * * *